US009739216B2

(12) United States Patent
Andrejak et al.

(10) Patent No.: US 9,739,216 B2
(45) Date of Patent: Aug. 22, 2017

(54) METHOD FOR REGULATING A GENERATOR SET

(71) Applicant: MOTEURS LEROY-SOMER, Angouleme (FR)

(72) Inventors: Jean-Marie Andrejak, Saint Yrieix (FR); Samuel Moser, Gond-Pontouvre (FR); Patrice Betge, L'Isle d'Espagnac (FR)

(73) Assignee: MOTEURS LEROY-SOMER, Angouleme (FR)

( * ) Notice: Subject to any disclaimer, the term of this patent is extended or adjusted under 35 U.S.C. 154(b) by 0 days.

(21) Appl. No.: 14/647,576

(22) PCT Filed: Nov. 22, 2013

(86) PCT No.: PCT/IB2013/060338
§ 371 (c)(1),
(2) Date: May 27, 2015

(87) PCT Pub. No.: WO2014/083487
PCT Pub. Date: Jun. 5, 2014

(65) Prior Publication Data
US 2015/0315989 A1    Nov. 5, 2015

(30) Foreign Application Priority Data
Nov. 27, 2012 (FR) ...................... 12 61308

(51) Int. Cl.
*F02D 29/00* (2006.01)
*F02D 29/06* (2006.01)
(Continued)

(52) U.S. Cl.
CPC ............. *F02D 29/06* (2013.01); *F02D 41/30* (2013.01); *H02P 9/04* (2013.01)

(58) Field of Classification Search
CPC . F02D 29/02; F02D 41/30; H02P 9/04; H02P 9/48; H02J 9/066; H02J 9/062; H02M 5/458; H02M 2001/007
See application file for complete search history.

(56) References Cited

U.S. PATENT DOCUMENTS 5,703,410 A * 12/1997 Maekawa ................ H02P 9/04
123/339.16
5,730,094 A * 3/1998 Morris .................. B60W 10/06
123/192.1

(Continued)

FOREIGN PATENT DOCUMENTS

DE    10 2004 017 087 A1    11/2005
EP         2 083 498 A1    7/2009
(Continued)

OTHER PUBLICATIONS

Sep. 30, 2014 International Search Report issued in International Patent Application No. PCT/IB2013/060338.
(Continued)

*Primary Examiner* — Hieu T Vo
*Assistant Examiner* — Sherman Manley
(74) *Attorney, Agent, or Firm* — Oliff PLC (57) ABSTRACT

The invention concerns a method for regulating the injection of fuel into a heat engine of a generator set including an alternator driven by the heat engine, the alternator including a voltage regulator, the heat engine including a speed regulator having an inlet that can receive an external speed setpoint, the method including the following steps: detecting a variation in torque and kinetic energy from electrical measurements on the alternator, carrying out an action on the input of the setpoint of the voltage regulator and/or the speed regulator, on the basis of the magnitude of the variation in torque relative to the kinetic energy level.

10 Claims, 4 Drawing Sheets

(51) Int. Cl.
*F02D 41/30* (2006.01)
*H02P 9/04* (2006.01)

(56) References Cited

U.S. PATENT DOCUMENTS

| | | | | |
|---|---|---|---|---|
| 7,105,938 | B2* | 9/2006 | Edelson | B60L 11/04 |
| | | | | 180/65.22 |
| 7,471,008 | B2* | 12/2008 | Stahlhut | H02P 9/04 |
| | | | | 290/52 |
| 7,598,623 | B2* | 10/2009 | Fattal | B60L 11/123 |
| | | | | 290/40 F |
| 7,629,699 | B2* | 12/2009 | Annen | H02K 7/1884 |
| | | | | 290/1 A |
| 7,905,813 | B2* | 3/2011 | Edelson | B60L 11/04 |
| | | | | 477/110 |
| 8,205,594 | B2* | 6/2012 | Fore | F02D 29/06 |
| | | | | 123/339.18 |
| 8,515,645 | B2* | 8/2013 | Bucci | F02D 29/06 |
| | | | | 701/99 |
| 2003/0107349 | A1* | 6/2003 | Haydock | H02J 9/062 |
| | | | | 322/28 |
| 2007/0228735 | A1* | 10/2007 | Becker | F02D 29/06 |
| | | | | 290/40 C |
| 2009/0134845 | A1* | 5/2009 | Czajkowski | F02M 37/0047 |
| | | | | 322/28 |
| 2009/0153105 | A1* | 6/2009 | Czajkowski | H02P 9/302 |
| | | | | 322/28 |
| 2010/0241283 | A1* | 9/2010 | Desai | H02J 7/1415 |
| | | | | 700/295 |

FOREIGN PATENT DOCUMENTS

| | | |
|---|---|---|
| EP | 2 204 565 A1 | 7/2010 |
| JP | 2002-106394 A | 4/2002 |
| WO | 2007/045801 A1 | 4/2007 |

OTHER PUBLICATIONS

Sep. 30, 2014 Written Opinion issued in International Patent Application No. PCT/IB2013/060338.

* cited by examiner

METHOD FOR REGULATING A GENERATOR SET

The present invention relates to the regulation of electric generating sets.

An electric generating set consists of the assembly of an engine and of an alternator. In order to provide a nominal voltage and a nominal frequency, both the engine and the alternator are equipped with regulating means. The engine is equipped with an electronic speed regulator, integrated into the fuel injection system of the engine. The regulation of the speed of the engine relies among other things on the measurement of the rotation speed of the shaft of the engine, for example by a sensor counting per time unit the number of teeth of a toothed ring gear passing in front of the sensor. An injection computer of the speed regulator determines by virtue of the signal delivered by this sensor the fuel injection level so as to maintain the speed at a predefined value, but does not have direct knowledge of the load level which is applied to the engine. Each variation in load applied to the engine, whether it be an increase or a decrease, results in a transient decrease or an increase in the engine speed that the speed regulator attempts to correct through an appropriate injection level.

In a good number of known electric generating sets, it is thus only by virtue of the knowledge of the speed and injection level that the regulator determines the load level which is applied to the engine.

Moreover, the torque C demanded to the engine is directly proportional to the current I at the output of the alternator. Indeed, the power law P for the engine is:

$$P = C \cdot w,$$

where w is the rotation speed of the engine.

The power law P for the alternator is:

$$P = U \cdot I \cdot \cos(\phi),$$

where U is the output voltage of the alternator and $\phi$ the phase shift between the current I and the voltage U.

The engine and the alternator being mechanically linked, it is possible to write, in a simplified manner, that: $C \cdot w = U \cdot I \cdot \cos(\phi)$.

During the application of a large active load, $\cos(\phi)$ becomes close to 1, and the voltage of the alternator drops. The alternator is equipped with a voltage regulator which rapidly corrects this voltage drop by increasing the current in the pole wheel.

The variation of the load also results in a drop in speed, since the torque C demanded to the engine increases. The engine being incapable of responding instantaneously to this demand, its speed w drops, since a part of the torque C is drawn from the rotational kinetic energy reserve.

The way in which the engine picks up speed is essentially conditioned by how rapidly aid is applied to the engine by the voltage regulator.

The invention is more particularly but not exclusively concerned with sets equipped with turbocharger engines.

A drawback of this type of engine is the degradation of its performance if turbocharging cannot be initiated correctly. Now, a heavy increase in the load is liable to slow the engine too much for correct operation of the latter. During idle operation, the air intake pressure is close to atmospheric pressure but as soon as the increase in the load is applied to the electric generating set, the speed of the engine drops to such a point that, despite the reaction of the speed regulator on the injection system, the exhaust gas stream is not sufficient to initiate the turbine or turbines of the turbochargers to their operating regime. They are then incapable of making the intake pressure increase, required in order for the engine to be capable of accelerating and of regaining its nominal speed. There therefore exists a limit point that it is necessary to avoid reaching.

In a known manner, the engine aid is applied when the engine has already dropped in speed and its speed has dipped below a certain value.

It is known from U.S. Pat. No. 5,703,410 to control the excitation current of an alternator and the fuel injection on the basis of the knowledge of the rectified voltage at the output of the alternator.

It is also known from application EP 1 938 447 to control the fuel intake actuator of an electric generating set by virtue of a control device delivering a control signal which substitutes for an output signal of the speed regulator when a load variation is detected.

Application US 2007/0228735 discloses an energy production system in which a control device acts on the generator to change its output voltage in response to a variation of the rotation speed. In an example, the control device acts directly on a controlled rectification bridge (SCR) and its control prevails over the control performed by the voltage regulator. In this situation, the voltage regulator may no longer play its role and share in complete saturation. A drawback of this system is that during return to normal operation, a jerk will take place as long as the voltage regulator is not reset.

Application DE 10 2004 017 087 describes the regulation of the fuel injection in an engine at the level of the speed regulator, by detecting a modification of the load. This involves fabricating a specific speed regulator.

Application US 2010/0241283 discloses a regulating method modifying the excitation current in the case of an increase in power. The speed regulator cooperates closely with the voltage regulator, thus entailing an integrated design of the voltage regulator or of the speed regulator, and an appropriate design of the speed regulator.

There exists a requirement to further improve the performance of electric generating sets, in particular without changing the design of the pre-existing speed regulators, so as to manage the variations of the load and facilitate the use of turbocharger engines.

The invention is aimed at addressing this requirement at least in part and it achieves same, according to one of its aspects, by virtue of a method for regulating the fuel injection in an engine of an electric generating set comprising an alternator driven by the engine, the alternator comprising a voltage regulator, the engine comprising a speed regulator having an input able to receive an external speed setpoint, the method comprising the following steps:

detecting a variation of torque and of kinetic energy of the electric generating set by electrical measurements on the alternator, exerting, as a function of the amplitude of the torque variation relative to the kinetic energy level, an action on the input of the setpoint of the voltage regulator and/or of the speed regulator.

By virtue of the invention, the knowledge of the torque and kinetic energy level right from the application of a load, and of the variation of torque or of kinetic energy, makes it possible to apply an appropriate correction instantaneously to the electric generating set.

This correction is possible by virtue of the communication of information between the voltage regulator and the speed regulator, allowing in particular a modification of the speed setpoint value of the speed regulator of the engine. The performance of the electric generating set is increased without any other modification of its characteristics, thus making it possible to implement the invention with few modifications, or indeed without any modification of the speed regulator of the engine and therefore to apply the invention to existing engines.

The speed regulator may be embodied in the form of one or more electronic cards, accommodated for example in one or more housings specific to the engine, and the voltage regulator may be embodied in the form of one or more electronic cards, accommodated for example in one or more housings specific to the alternator.

The action exerted on the input of the setpoint of the speed regulator may consist in modifying the speed setpoint value of the engine, by increasing it or by decreasing it.

The differentiated regulation which is exerted by virtue of the invention is performed as a function of the torque and kinetic energy level, and of the variation of torque. The amplitude of the torque variation may be determined with respect to the previous measurement of the level of the torque.

Thus, the action may be exerted only on the voltage regulator if the amplitude of the torque variation relative to the kinetic energy level is below a predefined threshold.

The action may be exerted both on the input of the speed regulator and of the voltage regulator if the amplitude of the torque variation relative to the kinetic energy level is above a predefined threshold.

These predefined thresholds advantageously depend on the characteristics of the engine and those of the alternator.

The actions to be exerted on the voltage regulator and/or the speed regulator as a function of the variation of torque and of the kinetic energy may be determined by a predefined control law, for example prerecorded in a table, or computed in real time.

The control law may be such as defined in the chart hereinbelow:

|       | $\Delta_1$ | $\Delta_i$ | $\Delta_n$ |
|-------|-----------|-----------|-----------|
| $E_1$ | $A_{1,1}$ | $A_{i,1}$ | $A_{n,1}$ |
| $E_j$ | $A_{1,j}$ | $A_{i,j}$ | $A_{n,j}$ |
| $E_n$ | $A_{1,n}$ | $A_{i,n}$ | $A_{n,n}$ | where $E_j$ represents a kinetic energy level, $E_1 < \ldots < E_j < \ldots < E_n$, $\Delta_i$ the variation of torque, $\Delta_1 < \ldots < \Delta_j < \ldots < \Delta_n$, and $A_{ij}$ the action to be exerted on the speed regulator and/or the voltage regulator.

Thus, according to the amplitude of the torque variation $\Delta_i$ and the level $E_j$ of the kinetic energy, a particular action $A_{ij}$ takes place. This action $A_{ij}$ may consist in certain cases in not acting on the voltage regulator and speed regulator, which in this case retain autonomous operation by regulating respectively the voltage and the speed independently of one another, or in other cases in an action exerted solely on the voltage regulator, for example to change a voltage setpoint or in an action exerted both on the voltage regulator and on the speed regulator, for example to change both a speed setpoint and a voltage setpoint.

The speed setpoint value of the engine may be transmitted to the input of the speed regulator of the engine via an information transport bus, in particular by a series link or an analog signal. The bus may be linked to a control interface for the electric generating set, for example disposed in a cabinet disposed in front of or on the side of the set. The voltage regulator may also be linked by the aforementioned bus to the speed regulator, or otherwise transmit the information regarding change of setpoint speed to the speed regulator.

The input of the speed regulator receiving the speed setpoint may be analog or digital or communication based.

The voltage regulator of the alternator may observe at any moment the levels of torque and of kinetic energy of the engine and very rapidly determine the speed setpoint value to be applied. In the invention, the voltage regulation is thus done having knowledge of the torque and kinetic energy level and of their variation.

The detection of a variation of the load by virtue of the observation of the torque and kinetic energy level via the observation of electrical quantities allows anticipation of the drop in speed of the engine and makes it possible to implement actions to limit this drop in an effective manner.

The electrical power at the output of the alternator, making it possible to determine the torque level applied to the engine, may be determined with the aid of a current sensor measuring the current passing through the main armature winding of the alternator and of knowledge of the voltage at the output of the alternator. The electrical power may be computed with customarily known electrical quantities of a voltage regulator.

The transmission of information between the voltage regulator and the speed regulator may be unidirectional, solely from the voltage regulator to the speed regulator.

During the computation of the speed setpoint, knowing the torque and kinetic energy level of the electric generating set is useful, the state of the engine before the variation of the load influencing its behavior during the variation of the load, for example on the intake pressure.

The action on the voltage regulator may comprise the modification of the value of the current in the pole wheel, so as to temporarily bring the output voltage of the alternator to a value below that before detection of the variation of torque and of kinetic energy, with a view to decreasing the torque level demanded to the engine, preferably before the engine has dropped in speed.

The current in the pole wheel is thus decreased in an appropriate manner even in case of low applied load and the torque of the engine is reduced in an appropriate manner for the duration required for the increase in the mechanical power of the engine.

To act on the current in the pole wheel, it is possible to act on the excitation current of the exciter when the alternator comprises an exciter having a coiled stator. The modification of the current in the pole wheel may be performed for example by decreasing the excitation current of the exciter.

In particular in the case of an alternator comprising an exciter whose stator comprises permanent magnets, it is possible to act on the current in the pole wheel by disposing on the rotor a switching system making it possible to modulate the current in the pole wheel.

In such a variant, the alternator may comprise, at the rotor, a controller controlling the switching system. A transmission system, for example wireless, may communicate with the voltage regulator situated at the stator of the alternator.

The controller may control the switching system so as to regulate the output voltage of the alternator, for example by a pulse width modulation of the voltage across the terminals of the pole wheel. The regulator may vary the duty cycle of the pulse width modulation as a function of the voltage sought at the output of the alternator. Such a variant makes it possible to improve the response time of the electric generating set when the load varies.

The output of the alternator may be linked to a three-phase network, the nominal rotation speed of the engine being for example 1500 rpm, the nominal frequency being for example equal to 50 Hz, and the nominal output voltage between phases of the alternator being for example 400V.

The subject of the invention is further, according to another of its aspects, an electric generating set comprising an engine and an alternator driven by the engine, suitable for implementing the method according to the invention, such as defined hereinabove.

The set may comprise a bus allowing the exchange of information between the voltage regulator and a user interface, which may take for example the form of a control cabinet situated in a different location from the voltage regulator. The exchange of the information on the bus is performed for example by a series transmission protocol, for example CAN or other.

The set is equipped with a regulating system which ensures that the variation of electrical data at the output of the alternator is best utilized to maintain the engine in a suitable operating span. This regulating system implements the method defined above.

All the characteristics of the invention enumerated hereinabove in respect of the method are thus valid in respect of the electric generating set.

The regulating system may comprise a computer, in particular at the level of the voltage regulator, which determines the variation of torque and of kinetic energy and, as a function of the amplitude of the torque variation relative to the kinetic energy level, exerts an action on an input of the voltage regulator and/or of the speed regulator. This makes it possible to decrease the torque level demanded to the engine and/or to increase the speed of the latter, preferably before the engine has slowed. This regulating system may be integrated into the voltage regulator.

The invention will be able to be better understood on reading the detailed description which will follow, of non-limiting examples of implementation of the latter, and on examining the appended drawing in which.

Figure 1:
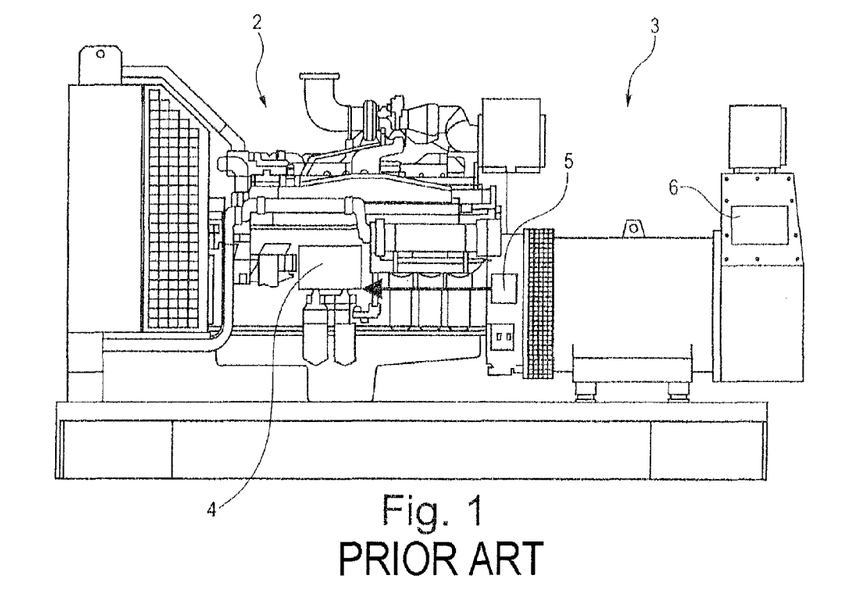
FIG. 1 represents an electric generating set according to the prior art.

An electric generating set according to the prior art comprises, as illustrated in FIG. 1, an engine 2 and an alternator 3, to which a load is applied.

The engine 2 comprises a speed regulator 4 which is for example known per se, comprising an injection computer which computes the injection (or the control of the gases) of the engine so that the rotation speed w is maintained constant as far as possible at a nominal value $w_n$ which depends on the polarity of the alternator and the output current frequency sought, for example 1500 rpm for a frequency of 50 Hz.

The engine 2 comprises a speed sensor 5 that may be, for example, inductive, capacitive or optical. The sensor 5 is for example disposed in front of a toothed ring gear driven in rotation by the engine, and delivers pulses at a frequency proportional to the rotation speed w.

The speed regulator 4 receives the signal from the sensor 5 and computes the appropriate fuel injection level to maintain the speed.

Figure 5:
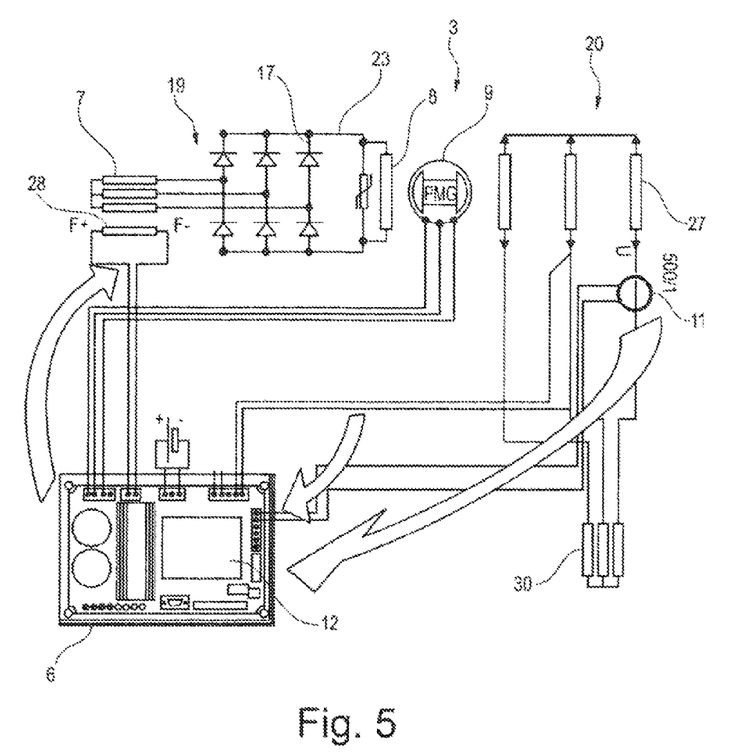
FIG. 5 represents, in isolation, an alternator and a voltage regulator according to the invention.

The rotor 19 of an alternator 3 according to the invention may comprise, as illustrated in FIG. 5, a rectifier 17 composed of a full-wave diode bridge, supplying a DC bus 23 on the basis of the exciter armature 7.

The alternator 3 may comprise at the stator 20 an exciter inductor 28, and the main armature winding 27 is linked to a load 30, represented schematically.

The output of an alternator 3 according to the invention supplies for example a three-phase network, the nominal speed $w_n$ of rotation of the engine 2 being for example 1500 rpm, the nominal frequency $F_n$ being equal for example to 50 Hz, and the nominal output voltage $U_n$ between phases of the alternator being for example 400V.

The engine 2 is advantageously a turbocharged engine, but the invention is not limited to a particular engine type.

The speed regulator 4 comprises an input able to receive an external speed setpoint. The invention is not limited to a particular type of input, the latter being able to be digital or analog or communication based.

Figure 2:
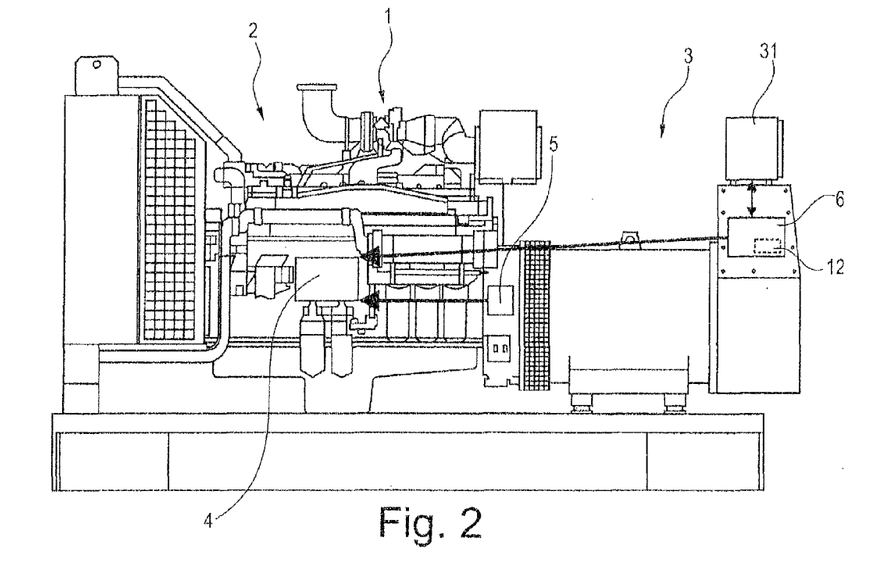
FIG. 2 represents an electric generating set according to the invention.

The alternator 3 comprises, as illustrated in FIG. 2, a voltage regulator 6 which comprises a regulating system designed to detect a variation of the load, on the basis of a detection of a variation of the torque and/or of kinetic energy of the engine 2. The voltage regulator 6 may be a digital regulator, but the invention is not limited to a particular voltage regulator type.

The electric generating set 1 may comprise, as in the example described, a user interface 31 which communicates with the voltage regulator 6 and the speed regulator 4, for example by way of an information exchange bus, for example by a CAN, Mod Bus, CAN open, J1939, proprietary, or other link protocol. Thus, the voltage regulator 6 may transmit information to the speed regulator 4, and in particular change the speed setpoint value.

The user interface 31 may comprise a control screen, for example a network analyzer or an installation supervisor. The user interface 31 may perform for example the reading and the display of the values of voltage, current, power and temperature of the alternator 3. The interface 31 may make it possible to adjust the voltage, the power factor, the power unit, the manual operating point, or else the gains of each regulating loop, and the parameters of the aid to the optimization of the responses in the transient regime, if appropriate.

The user interface 31 also makes it possible to adjust limiting parameters, diverse options, and parameters dependent on the type of alternator used.

The voltage regulator 6 may be supplied by a generator having permanent magnets 9 or by any other means.

The voltage regulator 6 comprises a computer 12, for example having a microprocessor, represented in FIG. 5, which determines the current to be applied in the pole wheel 8 to maintain the amplitude of the voltage at a setpoint value which by default is the nominal voltage $U_n$.

The modification of the current in the pole wheel 8 is performed in particular by decreasing the excitation current of the exciter, the voltage regulator 6 acting on this current in a conventional manner.

In a variant, the modification of the current in the pole wheel 8 is performed by virtue of a pulse width modulation of the voltage across the terminals of the pole wheel.

Figure 3:
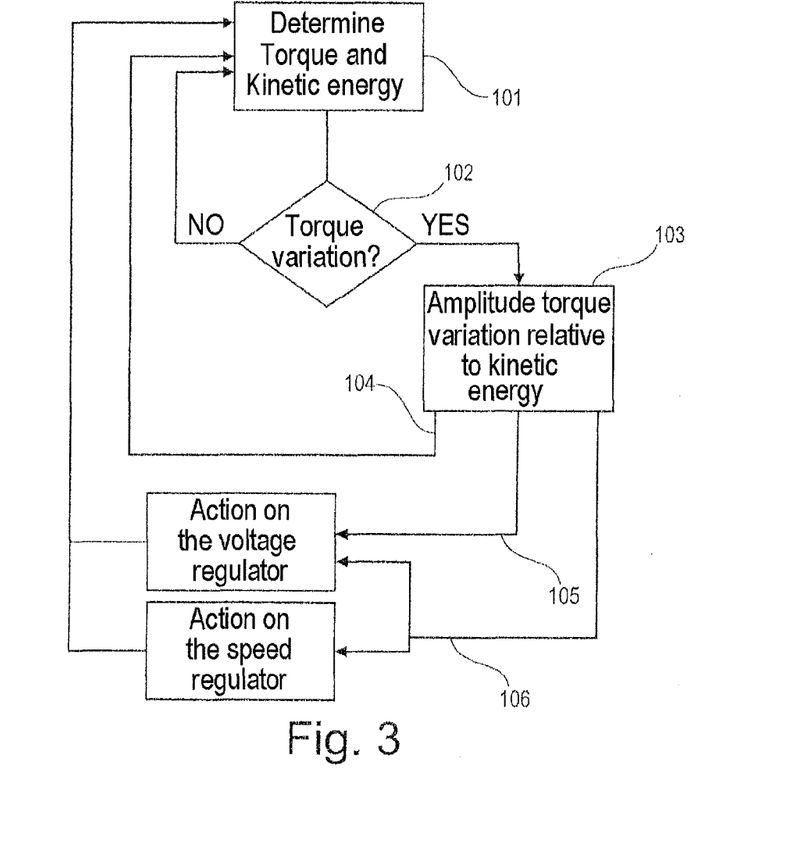
FIG. 3 is a block diagram illustrating a method according to the invention.

The voltage regulator 6 computes, during a step 101 represented in FIG. 3, the levels of torque and of kinetic energy. These levels are computed by virtue of information relating to the electrical quantities at the output of the alternator 3, for example on the basis of the voltage U between output phases of the alternator and of the current passing through the main armature winding 27 of the stator 20, this current being determined by virtue of a current sensor 11 represented in FIG. 5.

In the course of the operation of the electric generating set, the torque value is examined to determine whether it has changed, this corresponding to step 102 of the diagram of FIG. 3. If appropriate, the amplitude of the torque variation is evaluated relative to the kinetic energy level, in a step 103, so as to determine whether an action must be exerted on the input of the speed regulator and/or of the voltage regulator.

If the torque variation is low, or if the kinetic energy level is sufficiently high, no action is exerted. The voltage regulator 6 then recomputes the levels of torque and of kinetic energy, as indicated at 104 in FIG. 3.

If the amplitude of the torque variation relative to the kinetic energy level is below a predefined threshold, an action is exerted on the voltage regulator 6 alone, during a step 105.

Finally, if the amplitude of the torque variation relative to the kinetic energy level is above the predefined threshold, an action is exerted both on the input of the speed regulator 4 and on the voltage regulator 6, during a step 106.

The predefined threshold depends on the characteristics of the engine 2 and those of the alternator 3.

Figure 4:
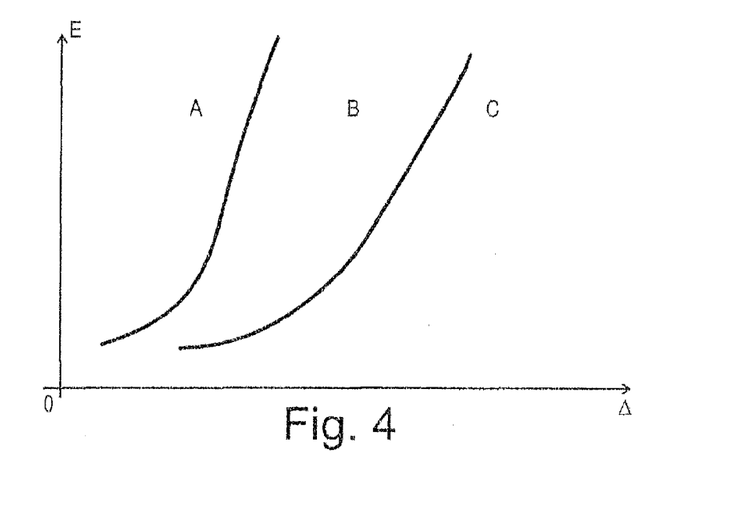
FIG. 4 illustrates various operating spans as a function of the level of kinetic energy and of the variation of torque.

Various actions which depend on the amplitude of the torque variation Δ relative to the kinetic energy level E are illustrated in FIG. 4. Region A corresponds to a fairly low variation of torque Δ, and whatever the kinetic energy level E, no action will be exerted. Region B corresponds to a mean variation of torque Δ, and an action will be exerted on the voltage regulator 6 only. Region C corresponds to a high variation of torque Δ, and whatever the kinetic energy level E, an action will be exerted both on the input of the speed regulator 4 and on the voltage regulator 6.

In case of an increase in the load, the action on the voltage regulator 6 comprises the modification of the value of the current in the pole wheel 8, so as to temporarily bring the output voltage U of the alternator 3 to a value below that before detection of the variation of torque and of kinetic energy, with a view to decreasing the torque level demanded to the engine 2.

Once the power of the engine has increased and the rotation speed w increases, the value of the current in the pole wheel 8 may be modified again, so as to restore the value of the output voltage U to that before the variation of torque, to a nominal operating point.

The invention is not limited to the example which has just been described with reference to FIGS. 2 to 5.

Figure 6:
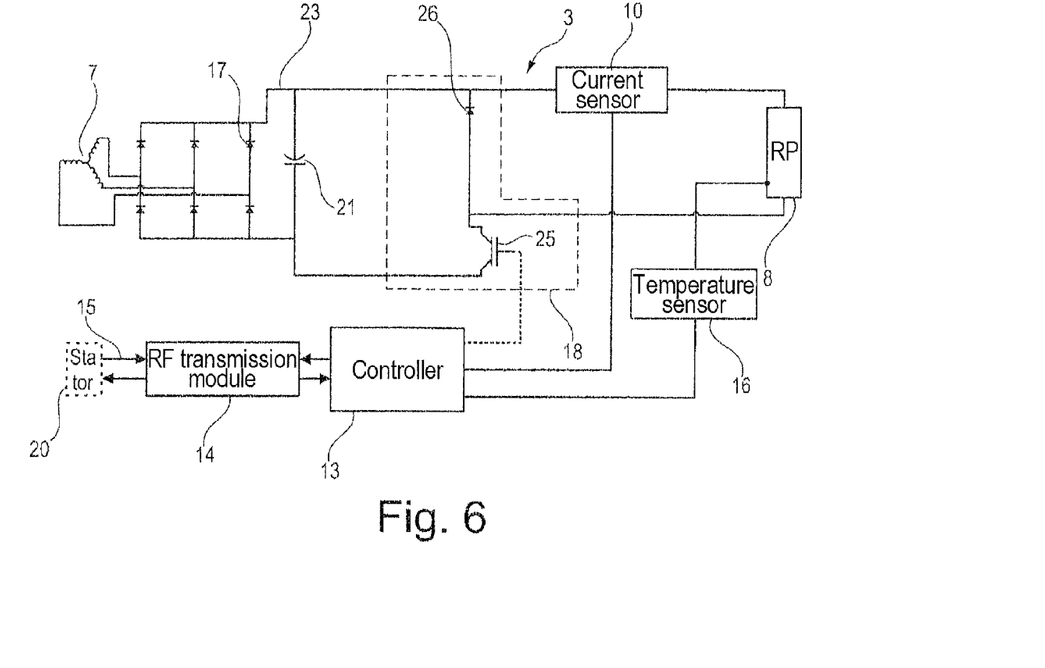
FIGS. 6 and 7 represent an alternator variant according to the invention.
Figure 7:
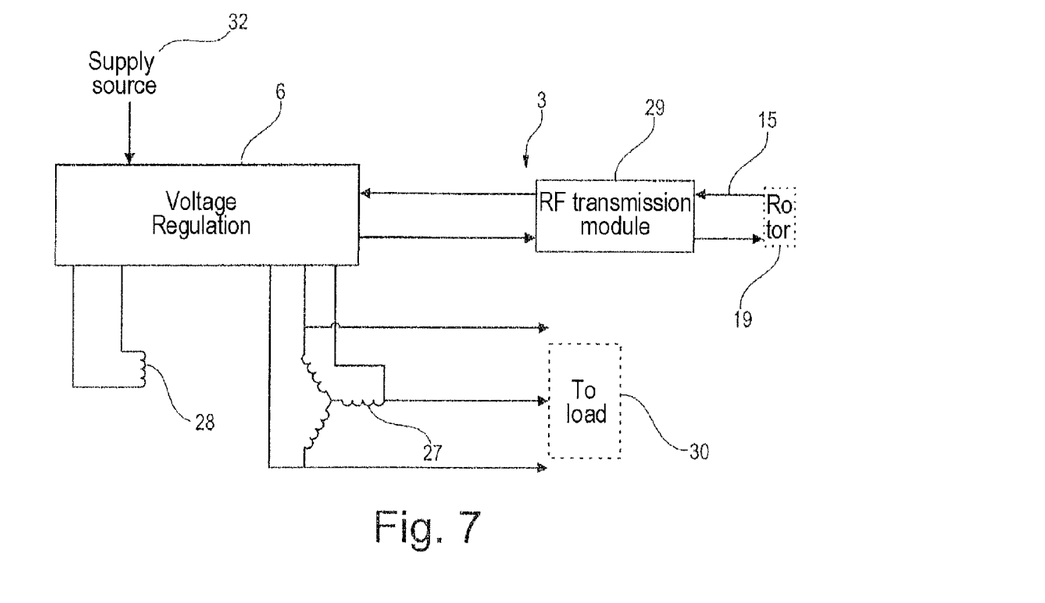

In the variant represented in FIGS. 6 and 7, the rotor 19 comprises an onboard communication system, and the DC bus 23 is linked to a switching system 18. A filtering capacitor 21 may be provided.

The switching system 18 may be composed, for example, as illustrated of a free wheel diode 26 and of a switchable electronic component 25, such as an IGBT transistor.

A controller 13 controls the switching system 18 so as to regulate, when necessary, by pulse width modulation, the voltage in the pole wheel 8. The duty cycle β of the pulse width modulation is dependent among other things on the output voltage of the main machine, so as to maintain as far as possible the voltage delivered by the alternator 3 at the desired value.

The rotor 19 comprises in the example illustrated a current sensor 10 to measure the current in the pole wheel 8. The value of the current thus measured is transmitted to the controller 13.

The voltage regulator 6 at the stator 20 is supplied by a power supply 32, and the exciter inductor 28 is coiled, in the example described. An HF wireless communication system is disposed between the controller 13 of the rotor 19 and the voltage regulator 6 of the stator 20 of the alternator 3. The wireless communication system is composed of a transmission module 14 disposed at the rotor 19, of a transmission module 29 disposed at the stator 20, and of wireless transmission pathways 15 linking said modules.

The value of the current in the pole wheel 8, measured by the current sensor 10 of the rotor 19, is transmitted to the voltage regulator 6 of the stator 20 by the wireless communication system 14, 15, 29.

The invention claimed is:

1. A method for regulating the fuel injection in an engine of an electric generating set comprising an alternator driven by the engine, the alternator comprising a voltage regulator, the engine comprising a speed regulator having an input able to receive an external speed setpoint, the method comprising the following steps:
   detecting a variation of torque and of kinetic energy by electrical measurements on the alternator; and
   exerting, as a function of the amplitude of the torque variation relative to the kinetic energy level, an action on the input of the setpoint of the voltage regulator and/or of the speed regulator, the action exerted on the input of the setpoint of the voltage regulator and/or of the speed regulator being such that:
   if the amplitude of the torque variation relative to the kinetic energy level is below a first predefined threshold, no action is exerted,
   if the amplitude of the torque variation relative to the kinetic energy level is between the first predefined threshold and a second predefined threshold, the action is exerted on the input of the setpoint of the voltage regulator, and
   if the amplitude of the torque variation relative to the kinetic energy level is above the second predefined threshold, the action is exerted on the input of the setpoint of the voltage regulator and of the speed regulator.

2. The method as claimed in claim 1, the action exerted on the input of the speed regulator consisting in modifying the speed setpoint value of the engine.

3. The method as claimed in claim 1, the speed setpoint value of the engine being transmitted by the voltage regulator to the speed regulator via a bus, in particular by a series link or an analog signal.

4. The method as claimed in claim 1, the action on the voltage regulator comprising the modification of the value of the current in the pole wheel, so as to temporarily bring the output voltage of the alternator to a value below that before detection of the variation of torque and of kinetic energy, with a view to decreasing the torque level demanded to the engine.

5. The method as claimed in claim 4, the modification of the current in the pole wheel being performed by decreasing the excitation current of the exciter.

6. The method as claimed in claim 4, the modification of the current in the pole wheel being performed by virtue of a pulse width modulation of the voltage across the terminals of the pole wheel.

7. The method as claimed in claim 1, the engine being a turbocharged engine.

8. An electric generating set comprising an engine and an alternator driven by the engine, the electric generating set being suitable for implementing the method for regulating fuel injection such as defined in claim 1.

9. A system for regulating the fuel injection in an engine of an electric generating set comprising an alternator driven by the engine, the alternator comprising a rotor having a pole wheel and a voltage regulator, the engine comprising a speed regulator having an input able to receive an external speed setpoint and a speed sensor, the system being configured to:
- detect a variation of torque and of kinetic energy by electrical measurements on the alternator; and
- exert, as a function of the amplitude of the torque variation relative to the kinetic energy level, an action on the input of the setpoint of the voltage regulator and/or of the speed regulator aimed at decreasing the torque demanded to the engine and/or at increasing the speed of the latter, wherein the action exerted on the input of the setpoint of the voltage regulator and/or of the speed regulator being such that:
  - if the amplitude of the torque variation relative to the kinetic energy level is below a first predefined threshold, no action is exerted,
  - if the amplitude of the torque variation relative to the kinetic energy level is between the first predefined threshold and a second predefined threshold, the action is exerted on the input of the setpoint of the voltage regulator, and
  - if the amplitude of the torque variation relative to the kinetic energy level is above the second predefined threshold, the action is exerted on the input of the setpoint of the voltage regulator and of the speed regulator.

10. The system as claimed in claim 9, comprising a controller rotating with the rotor and making it possible to control the current in the pole wheel by a pulse width modulation of the voltage across the terminals of the pole wheel.

\* \* \* \* \*